United States Patent
O'Brien, II

(10) Patent No.: US 7,588,431 B2
(45) Date of Patent: Sep. 15, 2009

(54) VARIABLE CAPACITY PUMP/MOTOR

(75) Inventor: James A. O'Brien, II, LaSalle, MI (US)

(73) Assignee: Limo-Reid, Inc., Deerfield, MI (US)

( * ) Notice: Subject to any disclaimer, the term of this patent is extended or adjusted under 35 U.S.C. 154(b) by 0 days.

(21) Appl. No.: 11/844,416

(22) Filed: Aug. 24, 2007

(65) Prior Publication Data

US 2008/0031763 A1 Feb. 7, 2008

Related U.S. Application Data

(63) Continuation of application No. 11/359,728, filed on Feb. 22, 2006, now Pat. No. 7,281,376, and a continuation-in-part of application No. 11/101,837, filed on Apr. 8, 2005, now Pat. No. 7,179,070.

(60) Provisional application No. 60/655,221, filed on Feb. 22, 2005, provisional application No. 60/560,897, filed on Apr. 9, 2004.

(51) Int. Cl.
*F03C 2/00* (2006.01)
*F04C 2/00* (2006.01)

(52) U.S. Cl. ......... 418/206.1; 418/19; 418/21; 418/206.6; 418/206.7; 418/132; 418/133; 417/310

(58) Field of Classification Search ......... 418/19, 418/21, 24, 132, 133, 206.1, 206.6, 206.7; 417/310
See application file for complete search history.

(56) References Cited

U.S. PATENT DOCUMENTS

| | | |
|---|---|---|
| 60,365 A | 12/1866 | Hardy |
| 815,522 A | 3/1906 | Fraser |
| 2,293,126 A | 8/1942 | Fersing |
| 2,484,789 A | 10/1949 | Hill et al. |
| 2,684,636 A | 7/1954 | Heldenbrand |
| 2,754,765 A | 7/1956 | Joy |
| 3,007,418 A | 11/1961 | Brundage |
| 3,110,265 A | 11/1963 | Miller |

(Continued)

FOREIGN PATENT DOCUMENTS

GB 2265945 A 10/1993

(Continued)

*Primary Examiner*—Theresa Trieu
(74) *Attorney, Agent, or Firm*—Fraser Clemens Martin & Miller LLC; William J. Clemens

(57) ABSTRACT

A variable capacity pump/motor has a meshing internal and external gear set disposed between an upper mandrel and a lower mandrel, each including a flange extending towards the gears to divide a pump/motor chamber into suction and discharge chambers. The inner gear is fixed and the external gear is axially moveable with respect thereto. The external gear and the upper mandrel move in response to changing pressures in the casing, allowing the motor to vary displacement and the pump to vary its output based on supplied fluid pressure or based on the speed of the prime mover. An external configuration includes a pair of meshing gears mounted on separate shafts in a casing. One gear is fixed and the other is axially moveable with respect thereto and moves in response to changing pressures in the casing. Each of the gears is sealed by a seal/bushing on a free end thereof.

9 Claims, 5 Drawing Sheets

U.S. PATENT DOCUMENTS

| | | | |
|---|---|---|---|
| 3,549,209 A | 12/1970 | Moericke |
| 3,588,295 A | 6/1971 | Burk |
| 3,805,526 A | 4/1974 | Charron |
| 3,827,239 A | 8/1974 | Ulrich, Jr. |
| 3,894,606 A | 7/1975 | Hunck et al. |
| 3,906,727 A | 9/1975 | Hull |
| 4,072,131 A | 2/1978 | Pentel |
| 4,131,171 A | 12/1978 | Keyes |
| 4,196,587 A | 4/1980 | Shiber |
| 4,242,066 A | 12/1980 | Hodgson |
| 4,242,922 A | 1/1981 | Baudoin |
| RE31,067 E | 10/1982 | Roberts |
| 4,426,199 A | 1/1984 | Wüsthof et al. |
| 4,484,655 A | 11/1984 | Sheppard, Sr. |
| 4,492,539 A | 1/1985 | Specht |
| 4,493,622 A | 1/1985 | Miller |
| 4,545,748 A | 10/1985 | Middlekauf |
| 4,563,136 A | 1/1986 | Gervais et al. |
| 4,740,142 A | 4/1988 | Rohs et al. |
| 4,812,111 A | 3/1989 | Thomas |
| 4,824,347 A | 4/1989 | Dlugokecki |
| 5,056,315 A | 10/1991 | Jenkins |
| 5,184,947 A | 2/1993 | Coombe |
| 5,305,721 A | 4/1994 | Burtis |
| 5,306,127 A | 4/1994 | Kinney |
| 5,335,750 A | 8/1994 | Geringer et al. |
| 5,476,374 A | 12/1995 | Langreck |
| 5,540,299 A | 7/1996 | Tohda et al. |
| 5,620,315 A | 4/1997 | Pfuhler |
| 5,724,812 A | 3/1998 | Baker |
| 5,784,883 A | 7/1998 | Ohkura et al. |
| 5,907,952 A | 6/1999 | Akasaka et al. |
| 6,006,519 A | 12/1999 | Hormell, Jr. |
| 6,244,839 B1 | 6/2001 | Cole et al. |
| 6,283,735 B1 | 9/2001 | Schreiber et al. |
| 6,553,759 B2 | 4/2003 | Matsufuji |
| 6,758,656 B2 | 7/2004 | Maier et al. |
| 6,862,885 B1 | 3/2005 | Mitchell |
| 6,877,577 B1 | 4/2005 | Smith |
| 6,971,232 B2 | 12/2005 | Singh |
| 7,179,070 B2 * | 2/2007 | O'Brien, II ............... 418/206.1 |
| 2001/0024618 A1 | 9/2001 | Winmill |
| 2003/0116368 A1 | 6/2003 | Winkelman et al. |
| 2005/0044873 A1 | 3/2005 | Tamai et al. |
| 2005/0178115 A1 | 8/2005 | Hughey |
| 2005/0223706 A1 | 10/2005 | Mitchell et al. |
| 2005/0247504 A1 | 11/2005 | Gleasman et al. |

FOREIGN PATENT DOCUMENTS

SU             400741 A        2/1974

* cited by examiner

VARIABLE CAPACITY PUMP/MOTOR

CROSS-REFERENCE TO RELATED APPLICATION

This application is a continuation of U.S. application Ser. No. 11/359,728 filed on Feb. 22, 2006 that claims the benefit of provisional application Ser. No. 60/655,221 filed on Feb. 22, 2005. Application Ser. No. 11/359,728 is a continuation-in-part of U.S. application Ser. No. 11/101,837 filed on Apr. 8, 2005, now U.S. Pat. No. 7,179,070, that claims the benefit of provisional application Ser. No. 60/560,897 filed on Apr. 9, 2004.

BACKGROUND OF THE INVENTION

The present invention relates generally to geared pumps and motors and, in particular, to a variable capacity geared apparatus usable as either a pump or a motor.

Numerous types of variable volume gear pumps and motors are found in the prior art. For example, the U.S. Pat. No. 2,293,126 shows a gear pump or motor having a gear housing movable by a lever secured to a stub shaft.

The U.S. Pat. No. 2,754,765 shows a variable displacement pump that includes a drive gear and a follower gear that displaces radially when a fluid pressure on an accumulator exceeds a predetermined value.

The U.S. Pat. No. 3,110,265 shows a gear type fluid handling device that includes an upper gear movable with respect to a lower gear via a lever.

The U.S. Pat. No. 3,588,295 shows a variable output gear pump or motor apparatus that includes an output gear assembly movable relative to an input gear assembly via a control output assembly that diverts fluid to the input side of the pump.

The U.S. Pat. No. 4,740,142 shows a variable capacity gear pump with pressure balance for transverse forces that includes a fixed gear and a gear axially movable relative to the fixed gear alternatively via a spring, via hydraulic pressure through bores, and via a controller.

The U.S. Pat. No. 5,184,947 shows a fully variable output hydraulic gear pump having an axially translatable gear and a fixed gear. The translatable gear is movable through a gear sleeve via hydraulic pressure controlled by a hydraulic cylinder or a motorized screw.

The U.S. Pat. No. 5,306,127 shows a fluid pump with axially adjustable gears having telescoping first and second cylindrical housings and mounted in the pump housing.

The U.S. Pat. No. 5,620,315 shows a gear pump for feeding of fluids that includes a fixed gear and a gear that is axially movable between a pair of shiftable walls.

The U.S. Pat. No. 5,724,812 shows a variable displacement apparatus that includes housing parts that are interconnected for relative axial movement.

The U.S. Pat. No. 6,283,735 shows a variable-delivery external gear pump that includes a steel compression spring that moves one of the gears axially with respect to the other gear based on pressure in the pump casing.

The U.S. Patent Application No. 2001/0024618 shows an adjustable displacement gear pump having a follower assembly that is operable to move an idler gear within a pump housing relative to a pump gear in order to vary the output of the pump. The pump gear includes a gear complement and the idler gear includes a gear complement for providing a seal for the gears. The displacement of the pump is varied by moving the follower assembly from a proximal end to a distal end of the pump. The follower assembly moves both the pump gear and the idler gear to vary a pump chamber length.

The U.S. Pat. No. 2,484,789 shows a variable displacement pump and motor that includes an outer gear and an inner gear mounted on a shaft and disposed between a pair of bulkheads. Displacement of the pump/motor is varied by moving the bulkhead axially along a shaft. Fluid is introduced to the gears via radial ports formed in the outer gear.

The U.S. Pat. No. 3,805,526 shows an embodiment of a variable displacement rotary hydraulic machine having a gerotor assembly that includes an inner element, an outer element, a plug that rotates with the inner element, and a plug that rotates with the outer element. The capacity and/or displacement of the pump or motor are varied by mechanical movement of a locating ring. Fluid is supplied to the elements through ducts.

The U.S. Pat. No. 4,492,539 shows a variable displacement gerotor pump having a housing that achieves variable displacement by positioning an axis of an outer rotor eccentric to the axis of an inner rotor by movement of a variator in the housing. The movement of the variator is alternately manual or hydraulic.

The U.S. Pat. No. 4,493,622 shows a variable displacement motor that includes an outer gerotor gear and an inner gerotor gear that transmits torque to an output shaft via a wobble shaft. The displacement of the motor is varied by varying the eccentricity between the meshing gears of the gerotor gears. A second embodiment of the motor includes a pair of gerotor gear sets.

The U.S. Pat. No. 4,812,111 shows a variable displacement apparatus usable as a pump or motor that includes an inner rotor movable relative to an outer rotor for varying the displacement of the apparatus. A distributor plate guides and directs flow from inlet and outlet ports through integral chambers and to the pump or motor displacement chambers. The distributor plate is fixed axially with respect to the inner rotor.

The U.S. Pat. No. 6,244,839 shows a pressure compensated variable displacement internal gear pump that includes an inner gerotor, a port plug, and an outer gerotor axially aligned on a drive shaft. The inner gerotor and the port plug slide inside the outer gerotor and vary displacement of the pump by opening and closing various intake and discharge ports defined by the outer gerotor.

The U.S. Pat. No. 6,758,656 shows a multi-stage internal gear/turbine fuel pump that includes a gear pumping module having an internal gear and an external gear and a turbine pumping module attached on a shaft.

The U.S. Pat. No. RE 31,067, and the U.S. Pat. Nos. 4,426, 199, 4,545,748, 4,563,136, and 4,824,347 show gerotor or internal gear pumps or motors.

It remains desirable, therefore, to provide an efficient variable capacity internal or external gear pump.

SUMMARY OF THE INVENTION

The internal gear pump in accordance with the present invention utilizes a meshing internal and external gear set. The gears are disposed between an upper mandrel and a lower mandrel, each of which mandrels includes a flange extending towards the gears to divide a pump/motor chamber into suction and discharge chambers. The upper mandrel includes spaced apart bores for supplying the suction and discharge chambers. The internal gear is fixed and the outer gear is axially moveable with respect to the fixed internal gear. The moveable outer gear and the upper mandrel move in response to changing pressures in the casing, allowing the motor or engine to vary its displacement and the pump to vary its output based on supplied fluid pressure or based on the speed of the prime mover.

The external gear pump in accordance with the present invention is a variable volume motor/engine/pump that includes a pair of meshing gears mounted on separate shafts in a casing. One of the gears is fixed and the other of the gears is axially moveable with respect to the fixed gear and moves in response to changing pressures in the casing, allowing the motor or engine to vary its displacement and the pump to vary its output based on supplied fluid pressure or based on the speed of the prime mover. Each of the gears is sealed by a gear seal/bushing on a free end thereof.

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

U.S. application Ser. No. 11/359,728 filed on Feb. 22, 2006, U.S. provisional application Ser. No. 60/655,221 filed on Feb. 22, 2005, U.S. application Ser. No. 11/101,837 filed on Apr. 8, 2005, now U.S. Pat. No. 7,179,070, and U.S. provisional application Ser. No. 60/560,897 filed on Apr. 9, 2004 are incorporated herein by reference.

Figure 1:
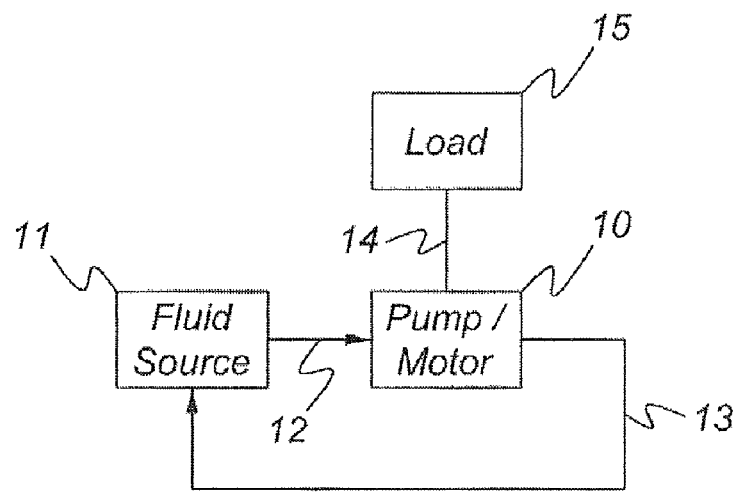
FIG. 1 is a schematic block diagram of the apparatus according to the present invention operating as a motor.

There is shown in FIG. 1 a pump/motor unit 10 according to the present invention operating as a motor. A source of pressured fluid 11 is connected to an inlet of the unit 10 by a line 12 to supply pressured fluid to drive the unit 10 as a motor. A return line 13 is connected to an outlet of the unit 10 to return the fluid to the source 11. The unit 10 has an output shaft 14 coupled to a load 15. Pressured fluid from the source 11 causes the unit 10 to rotate the shaft 14 and drive the load 15 which can be, for example, one or more drive wheels of a vehicle.

Figure 2:
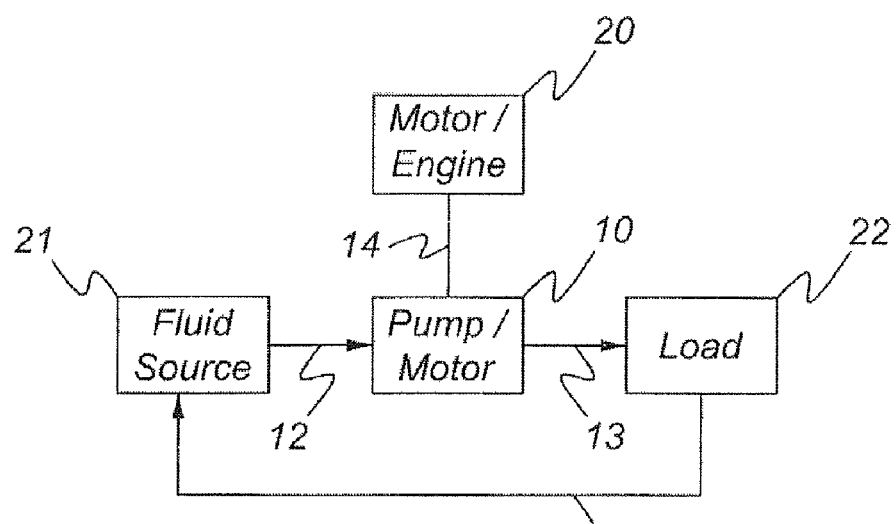
FIG. 2 is a schematic block diagram of the apparatus according to the present invention operating as a pump.

There is shown in FIG. 2 the pump/motor unit 10 according to the present invention operating as a pump. A source of fluid 21 is connected to the inlet of the unit 10 by the line 12 to supply fluid to be pumped by the unit 10. The return line 13 is connected to an outlet of the unit 10 to return the fluid to the source 21. The shaft 14 is coupled to a prime mover such as a combustion engine or electric motor 20. The prime mover 20 drives the unit 10 via the shaft 14 to generate pressured fluid to a load 22 connected in the return line 13.

Figure 3:
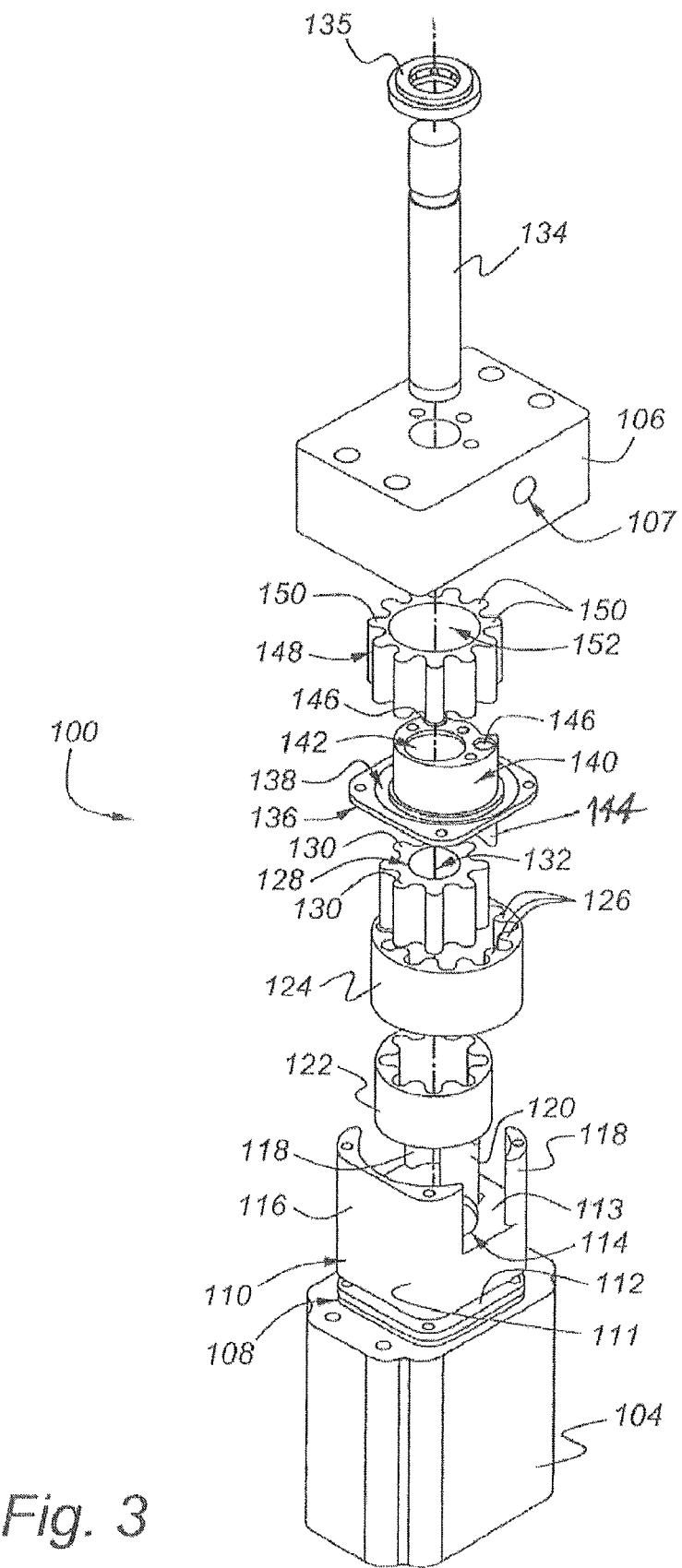
FIG. 3 is an exploded perspective view of an internal gear pump/motor in accordance with the present invention.
Figure 4:
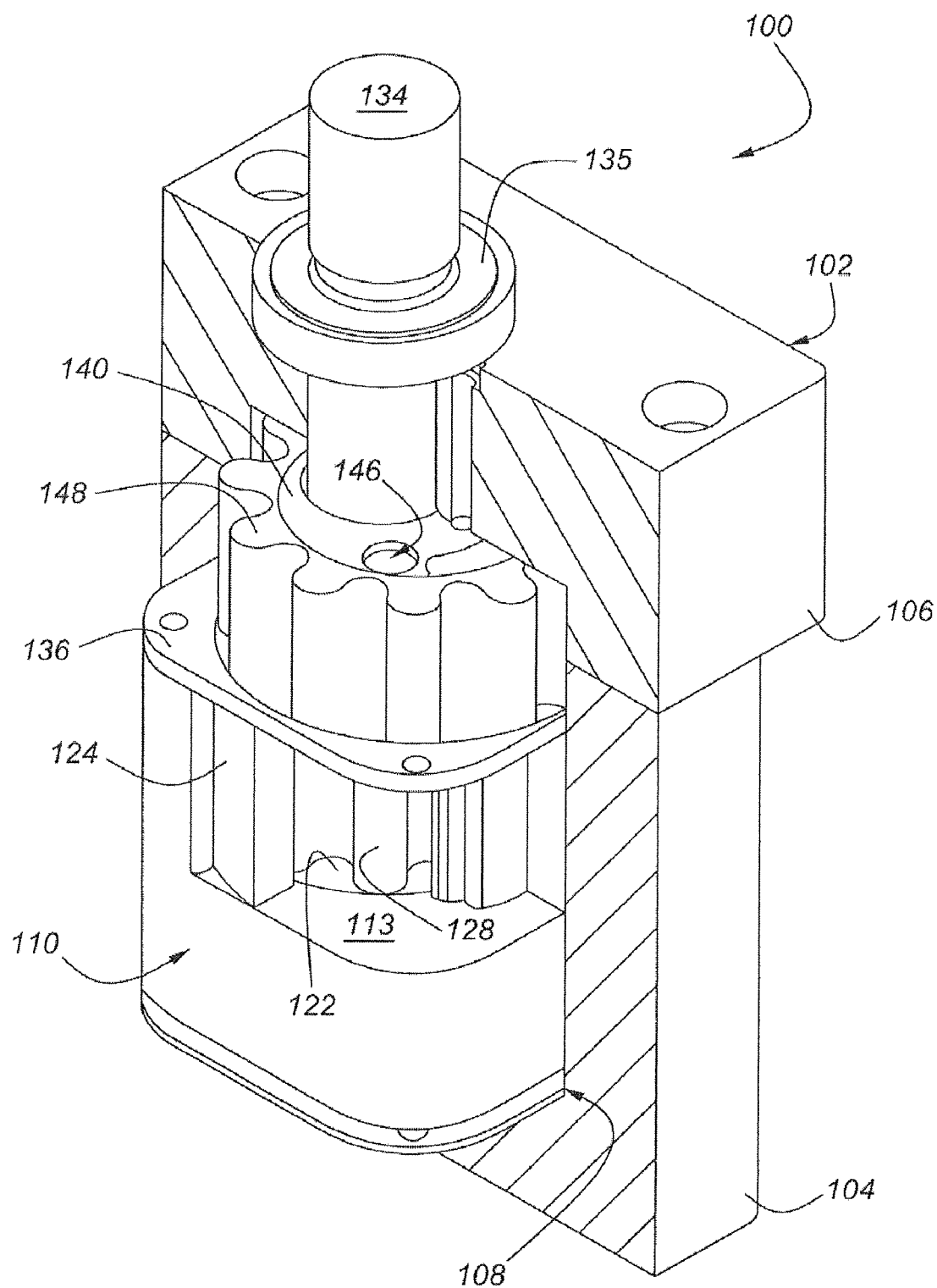
FIG. 4 is a partial cross sectional perspective view of the assembled internal gear pump/motor of FIG. 3.

Referring now to FIGS. 3 and 4, an internal gear apparatus in accordance with the present invention is indicated generally at 100. The apparatus 100 may be configured to operate as the motor 10 of FIG. 1 or the pump 10 of FIG. 2 as will be appreciated by those skilled in the art, but will be referred to as a motor in the following description of the present invention. The internal gear motor 100 includes a hollow housing 102 having a base portion 104 and an end cap 106. The base portion 104 defines a recess or cavity 108 therein that is sized to receive a first mandrel 110 and a first piston member 112. The end cap 106 includes at least two ports 107 (only one is shown) that each extend between an internal and an external surface thereof, preferably on opposite sides of the end cap 106. One of the ports 107 is connected to a high pressure segment of a fluid system (not shown) such as the pressured fluid source 11 of FIG. 1, and another of the ports 107 is connected to a return line such as the line 13 of FIG. 1.

The first mandrel 110 defines an aperture 114 extending through a base portion 111 thereof and includes a first outer flange 116 and a plurality of spaced apart second outer flanges 118 extending upwardly from an upper surface 113 of the base portion 111. An inner flange 120 extends upwardly from the base portion 111 of the first mandrel 110 and is located adjacent the aperture 114. The first outer flange 116 is located adjacent the aperture 114. The second outer flanges 118 are spaced apart from both the aperture 114 and the inner flange 120. A first seal bushing 122 is sized to rotatably fit in the aperture 114 and is preferably substantially equal in height to the base portion 111 of the first mandrel 110 such that when the bushing 122 is placed in the aperture 114, an upper surface of the bushing 122 is substantially flush with the upper surface 113 of the base portion 111.

An external gear 124 that is substantially circular in cross section is adapted to be placed atop the upper surface 113 of the base portion 111 wherein a curved outer surface of the gear 124 is adjacent the respective curved inner surfaces of the outer flanges 116 and 118. The external gear 124 includes a plurality of teeth 126 formed on an inner surface thereof. When placed on the upper surface 113, the gear 124 is fixed axially between the outer flanges 118 and the inner flange 120.

An internal gear 128 that is substantially circular in cross section includes a plurality of teeth 130 formed on an outer surface thereof and defines an aperture 132 extending there through. The teeth 130 are operable to mesh with the teeth 126 formed on the inner surface of the external gear 124. A lower surface of the gear 128 extends into and rotates with the bushing 122, wherein the teeth 130 cooperate with corresponding teeth on the bushing 122 when the motor 100 is assembled and operated, as discussed in more detail below. The respective outer surfaces of the teeth 130 of the internal gear 128 are adjacent the inner surface of the inner flange 120. The aperture 132 is adapted to receive a free end of a drive or output shaft 134 when the motor 100 is assembled. The internal gear 128 is fixed on the shaft 134. The drive shaft 134 is rotatably supported in the end cap 106 by a bearing 135, such as a ball bearing, a roller bearing or the like. The free end of the drive shaft 134 extends a predetermined distance beyond the upper surface of the end cap 106 and acts as an output shaft for the motor 100 such as the shaft 14 of FIG. 1.

A second piston member 136 defines an aperture 138 on an interior portion thereof and is adapted to be mounted on respective upper surfaces of the outer flanges 116 and 118 of the first mandrel 110. The second piston 136 and the first piston 112, therefore, are mounted on the upper surface and the lower surface, respectively of the lower mandrel 110.

A second mandrel 140 is adapted to be disposed in the aperture 138 of the second piston member 136 and defines an aperture 142 on an interior portion thereof for receiving the drive shaft 134. The second mandrel 140 includes a downwardly extending flange 144 that cooperates with the upwardly extending inner flange 120 of the first mandrel 110 when the motor 100 is assembled. The upper mandrel 140 includes a pair of bores 146 extending therethrough for fluid communication with the gears 122 and 124 during operation of the motor 100.

A second seal bushing 148 includes a plurality of teeth 150 formed on an exterior surface thereof and defines an aperture 152 extending therethrough. The second seal bushing 148 is adapted to receive the upper mandrel 140 in the aperture 152 and be received in the external gear 124 and rotates therewith, wherein the teeth 126 cooperate with the teeth 150 on the bushing 148 when the motor 100 is assembled and operated, as discussed in more detail below.

When the motor 100 is assembled, the first mandrel 110 and the first piston 112 are placed in the base portion 104 of the housing 102, the first seal bushing 122 is placed in the mandrel 110, and the external gear 124 is placed on the mandrel 110. The internal gear 132 and the second mandrel 138 are mounted on the drive shaft 134 and assembled such that the respective teeth 126 and 130 of the gears 132 and 124 rotatably mesh and the internal gear 132 engages with the first seal bushing 122. The second piston 136 is attached to the upper surface of the mandrel 110, and the second seal bushing 148 is placed on the second mandrel 138 and engages with the external gear 124. The downwardly extending flange 144 cooperates with the upwardly extending inner flange 120 to divide the interior of the external gear into an inlet chamber and discharge chamber of the motor 100 and the upper end cap 106 is attached to the base portion 104 to enclose the housing 102. The flanges 120 and 144 extend radially between the teeth 126 and the teeth 130 to form the inlet chamber on one side of the flanges and the discharge chamber on the other side of the flanges.

In operation, the shaft 134 is connected to a load (not shown), such as a wheel of a vehicle or the like. Pressured fluid is introduced from the fluid system through one of the ports 107, is routed to the inlet chamber side of the gears 124 and 128 through the bores 146, acts against the meshing teeth 126 and 130 to rotate the gears and the shaft, flows between the teeth to the discharge chamber and is discharged through the other the bores 146 to the other of the ports 107. The first seal bushing 122 provides a rotating seal between the internal gear 128 and the first mandrel 110 and the second seal bushing 148 provides a rotating seal between the external gear 124 and the second mandrel 140 to ensure the integrity of the inlet and discharge chambers. The motor 100 in accordance with the present invention requires only the seals 122 and 148 to maintain a fluid seal and allow for efficient operation of the motor 100.

The normal or default spatial relationship between the teeth 126 and 130 of the gears 124 and 128 is such that the teeth 126 and 130 engage substantially all of the axial area of the teeth. In such a relationship, the motor 100 produces its maximum volume flow or maximum output. The motor 100 in accordance with the present invention may advantageously vary from its maximum displacement because the gear 124 is axially movable along the shaft 134. When the gear 124 moves towards the first mandrel 110, less of the axial area of the teeth 126 and 130 engage, which reduces the volume flow or displacement of the motor 100.

When the unit 100 is configured as a motor, an external source of pressure, such as hydraulic fluid from an external hydraulic pump, compressed air from an air compressor or the like, provides a volume flow to the ports 107 to spin the gears 124 and 128 and produce an output torque on the shaft 134. As the pressure is varied, the gear 124 will move along the axis of the shaft 134 in order to vary the output horsepower of the motor 100. The motor 100 may be advantageously utilized to control output rpm under widely changing output loads including, but not limited to automotive vehicles, turrets, large machinery, earth movers, large well drills, ships, farm equipment, or the like.

When the unit 100 is configured as a pump and the prime mover rotates the shaft 134 at a lower speed or with a lower torque, the pump 100 will react to the reduced input speed or input torque by varying its output based on the internal pressures in the pump housing 102. In this condition, the output port 107 will create a higher back pressure in the discharge chamber, and the gear 124 will move along the axis of the shaft 134 to a point along the axis where the gear 124 is at or near equilibrium to continue operation. The pump 100, therefore, can vary from a maximum output or displacement where the gear 124 is substantially adjacent the upper mandrel 140 to a minimum displacement where the gear 124 is substantially adjacent the lower mandrel 110.

Figure 5:
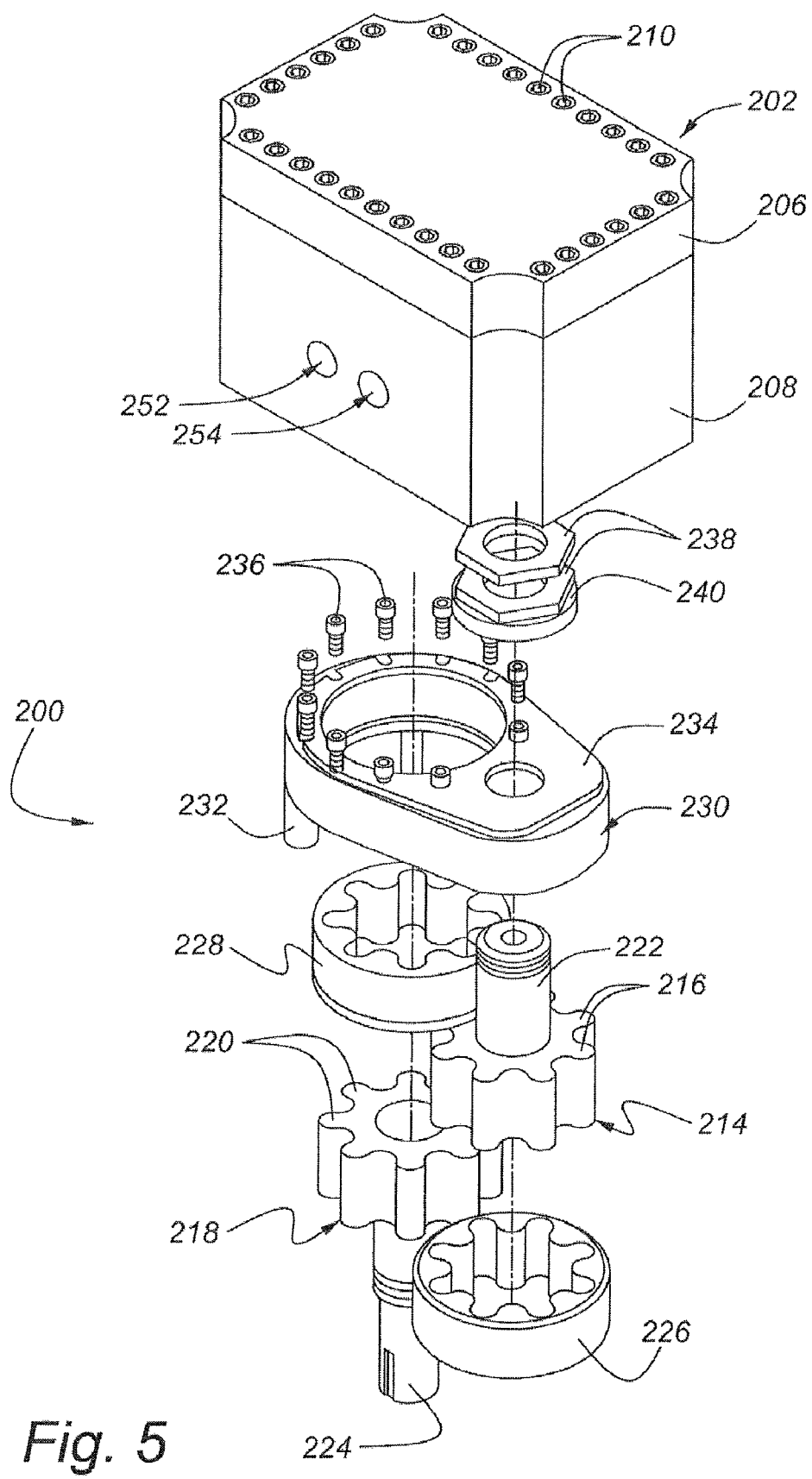
FIG. 5 is an partial exploded perspective view of an external gear pump/motor in accordance with the present invention.
Figure 6:
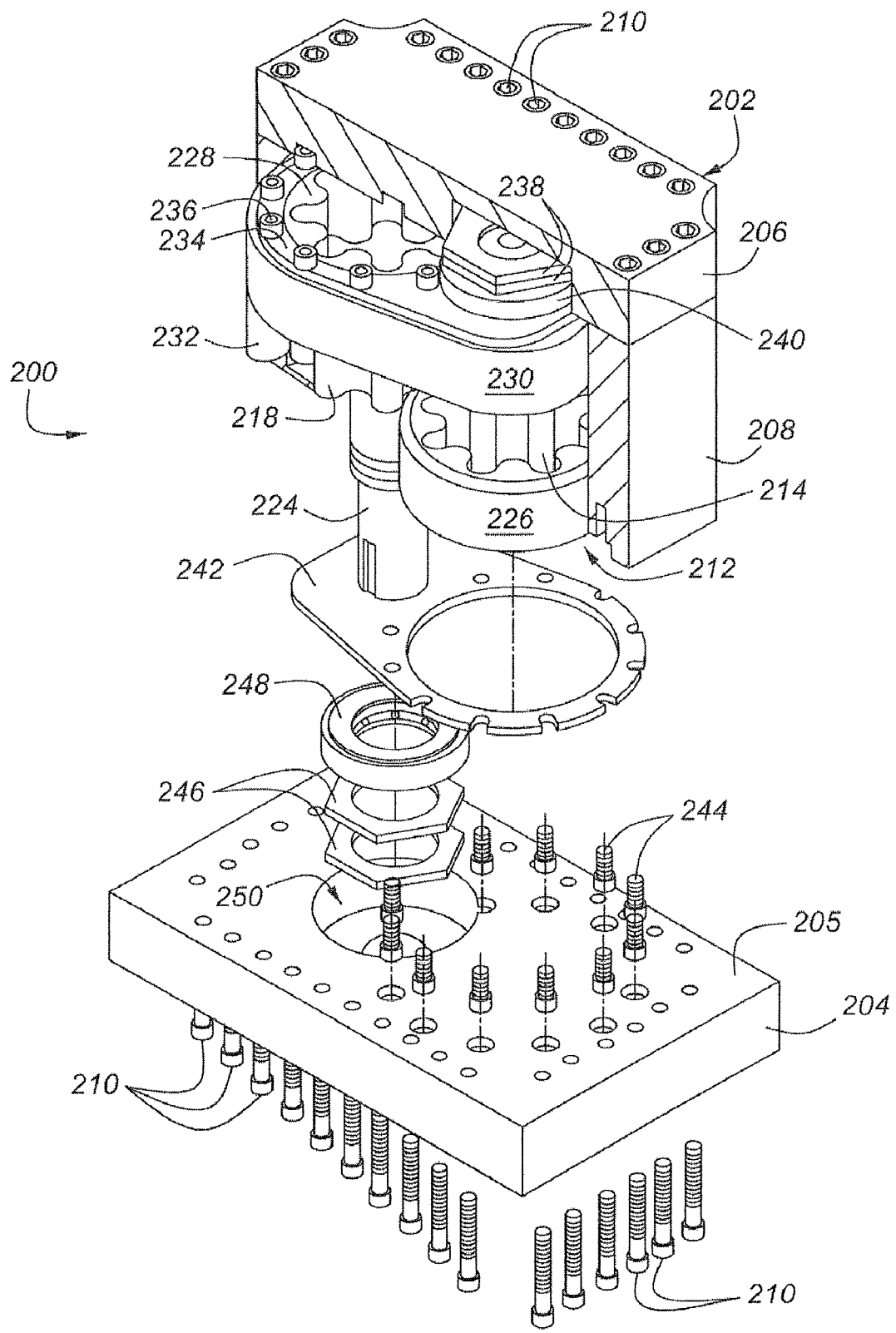
FIG. 6 is an exploded partial cross sectional perspective view of the external gear pump of FIG. 5.

Referring now to FIGS. 5 and 6, an external gear apparatus in accordance with the present invention is indicated generally at 200. The apparatus 200 may be configured to operate as a pump or a motor as will be appreciated by those skilled in the art, but will be referred to as a pump in order to simplify the description of the present invention. The external gear pump 200 includes a hollow housing 202 having a first end cap 204 and a second end cap 206 connected by a body portion 208. Preferably, the first end cap 204 and the second end cap 206 are attached to the body portion 208 by a plurality of fasteners 210, such as high strength bolts or the like. The body portion 208 defines a recess 212 therein.

A first gear 214 having a plurality of teeth 216 formed on an external surface thereof and a second gear 218 having a plurality of teeth 220 formed on an external surface thereof are adapted to be disposed in the recess 212 of the housing 202. The teeth 216 and 220 of the respective gears 214 and 218 are operable to rotatably mesh in the recess or pump cavity 212 during operation of the pump 200. The first gear 214 has a shaft 222 extending therefrom and the second gear 218 has a stepped shaft 224 extending therefrom. The first gear 214 is fixed on the shaft 222 and the second gear 218 is fixed on the shaft 224. The shafts 222 and 224 extend in opposite axial directions and the shaft 224 is greater in length than the shaft 222. A first seal sleeve 226 having internal teeth receives the first gear 214 and a second seal sleeve 228 having internal teeth receives an end of the second gear 218.

A plate fitting 230 includes a flange 232 extending downwardly therefrom and is attached to a first thrust plate 234 on a planar upper surface thereof. Preferably, the thrust plate 234 is attached to the fitting 230 by a plurality of fasteners 236, such as high strength bolts or the like. A free end of the shaft 222 extends through an opening formed in the fitting 230 and the thrust plate 234. The free end of the shaft 222 is rotatably secured in the fitting 230 and the thrust plate 234 by a pair of nuts 238 and is rotatably supported by a bearing 240, such as a ball bearing, a roller bearing or the like. The second seal sleeve 228 is operable to be received in a recess in the fitting 230 adjacent the flange 232. When the shaft 222 is mounted in the fitting 230 and the thrust plate 234, the gear 214 and the fitting 230 are movable axially with respect to the housing 202.

A second thrust plate 242 is attached to an upper surface 205 of the first end cap 204 by a plurality of fasteners 244, such as high strength bolts or the like. The plate 242 includes an aperture for receiving a free end of the shaft 224 and a larger aperture for receiving and locating the first seal sleeve 226 adjacent the upper surface of the first end cap 204. The free end of the shaft 224 extends through the aperture in the plate 242, threadably engages a pair of nuts 246 at the step and is rotatably supported by a bearing 248, such as a ball bearing, a roller bearing or the like. The bearing 248 is preferably disposed in a cavity 250 formed in the upper surface 205 of the first end cap 204 while the nuts 246 attach the shaft 224 to the end cap on a lower surface opposite the upper surface 205. The free end of the shaft 224 extends a predetermined distance beyond the lower surface of the end cap 204 and acts as a drive shaft or output shaft for the pump 200.

The body portion 208 defines a first port 252 and a second port 254 that each extend between an internal and an external surface thereof. One of the ports 252 and 254 is connected to a low pressure segment of a fluid system (not shown) such as a reservoir or the like, and another of the ports 252 and 254 is connected to a high pressure or pressurized segment of a fluid system.

In operation, the shaft 224 is connected to a prime mover (not shown), such as an electric motor or the like. When the prime mover rotates the shaft 224, the gear 218 rotates and causes the gear 214 to rotate. Fluid is introduced from the fluid system through one of the ports 252 or 254, is trapped between the meshing teeth 216 and 220 as is well known in the art and is discharged through the other of the ports 252 or 254. Suitable passages are formed in the housing 202 to ensure that the fluid is routed correctly during operation of the pump 200. The first seal sleeve 226 provides a rotating seal between the first gear 214 and the upper surface 205 and the second seal sleeve 228 provides a rotating seal between the second gear 218 and the fitting 230 to ensure the integrity of the pump cavity 212. The pump 200 in accordance with the present invention requires only the seal sleeves 226 and 228 to maintain a seal and allow for efficient operation of the pump 200.

The normal or default spatial relationship between the teeth 216 and 220 of the gears 214 and 218 is such that the teeth 216 and 220 engage substantially all of the axial area of the teeth. In such a relationship, the pump 200 produces its maximum volume flow or maximum displacement. The pump 200 in accordance with the present invention may advantageously vary from its maximum displacement because the first gear 214 is axially movable. When the first gear 214 moves towards the lower thrust plate 242, less of the axial area of the teeth 216 and 220 engage, which reduces the volume flow or displacement of the pump 200. Typically, this will occur when the prime mover rotates the shaft 224 at a lower speed or with a lower torque and the pump 200 will react to the reduced input speed or input torque by varying its output based on the internal pressures in the pump housing 202. In this condition, the output port 252 or 254 will create a higher back pressure in the recess 212, and the first gear 214 together with the fitting 230 will move along the axis of the shaft 224 to a point along the axis where the gear 214 is at or near equilibrium to continue operation. The pump 200, therefore, can vary from a maximum output or displacement where the gear 214 is substantially adjacent the gear 218 to a minimum displacement where the gear 214 is substantially adjacent the lower thrust plate 242.

When the apparatus 200 is configured as a motor, an external source of pressure, such as hydraulic fluid from an external hydraulic pump, compressed air from an air compressor or the like, provides a volume flow to the ports 252 and 254 to spin the gears 214 and 218 and produce an output torque on the shaft 224. As the pressure is varied, the first gear 214 will move along the axis of the shaft 224 in order to vary the output horsepower of the motor 200. The motor 200 may be advantageously utilized to control output rpm under widely changing output loads including, but not limited to automotive vehicles, turrets, large machinery, earth movers, large well drills, ships, farm equipment, or the like.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A pump/motor apparatus comprising:
   a hollow housing having at least one inlet port formed therein for fluid into said housing and at least one outlet port formed therein for fluid out of said housing;
   a first mandrel disposed in said housing and having a first flange;
   a shaft rotatably mounted to said housing having an end extending into said housing;
   a second mandrel disposed in said housing and having a second flange;
   an external gear disposed on said first mandrel, said external gear having a center aperture with a plurality of teeth formed on a wall of said aperture;
   a internal gear received on said shaft end in said housing, said internal gear having a plurality of teeth formed on an exterior surface thereof, said internal gear being disposed in said aperture of said external gear with said teeth of said internal gear meshing with said teeth of said external gear, said internal gear being axially moveable along said shaft relative to said external gear, said flanges extending into said aperture and cooperating with said gears to form a variable displacement inlet chamber and a variable displacement discharge chamber;
   a rotatable first seal rotatably disposed in said first mandrel and engaging with a portion of said internal gear; and
   a rotatable second seal receiving said second mandrel and engaging with a portion of said wall of said aperture of said external gear whereby when pressured liquid is supplied to said at least one inlet port, the pressured fluid rotates said internal and external gears causing said shaft to rotate for operation as a motor, and when said shaft is rotated, said internal gear rotates said external gear for operation as a pump causing fluid to flow from said at least one inlet port to said at least one outlet port.

2. The apparatus according to claim 1 wherein said housing has an end cap attached to a base portion, said end cap having said at least one inlet port and said at least one outlet port formed therein.

3. The apparatus according to claim 2 wherein said shaft extends through said end cap.

4. The apparatus according to claim 2 wherein said base portion has a recess formed therein and said first mandrel is received in said recess.

5. The apparatus according to claim 1 wherein said second mandrel has at least a pair of bores formed therein for communicating fluid from said at least one inlet port to said at least one outlet port though said inlet and discharge chambers.

6. The apparatus according to claim 1 wherein said first seal has a plurality of internal teeth formed thereon engaging said teeth of said internal gear.

7. The apparatus according to claim 1 wherein said second seal has a plurality of external teeth formed thereon engaging said teeth of said external gear.

8. The apparatus according to claim 1 including a first piston attached to said first mandrel abutting said first seal and a second piston attached to said first mandrel through which said shaft, said second mandrel and said second seal pass.

9. A pump/motor apparatus comprising:

a housing having a cavity formed therein, at least one inlet port for fluid into said cavity and at least one outlet port fluid out of said cavity;

a first gear disposed in said cavity and having a plurality of teeth;

a second gear disposed in cavity and having a plurality of teeth meshing with said teeth of said first gear wherein said teeth of said first gear are external teeth and said teeth of said second gear are internal teeth, said first pear being positioned inside said second gear;

a shaft rotatably mounted to said housing, said second gear being attached to said shaft for co-rotation and being axially moveable along said shaft relative to said first gear for varying a displacement of said cavity;

a first mandrel and a second mandrel disposed in said cavity, each said mandrel having a flange extending into an aperture formed in said second gear and cooperating with said first gear to form an intake chamber end a discharge chamber;

a rotatable first seal rotatably disposed in said cavity and having a plurality of teeth engaging said teeth of said first gear; and a rotatable second seal disposed in said cavity and having a plurality of teeth engaging said teeth of said second gear whereby when pressured liquid is supplied to said at least one inlet port, the pressured fluid rotates said first and second gears causing said shaft to rotate for operation as a motor, and when said shaft is rotated, said second gear rotates said first gear for operation as a pump causing fluid to flow from said at least one inlet port to said at least one outlet port.

* * * * *